Oct. 6, 1931.  W. H. DEES  1,826,605

GRASS CATCHER FOR LAWN MOWERS

Filed July 7, 1930

INVENTOR
W. H. DEES
BY [signature]
ATTORNEY

Patented Oct. 6, 1931

1,826,605

UNITED STATES PATENT OFFICE

WILLIAM H. DEES, OF ST. LOUIS, MISSOURI, ASSIGNOR TO CANVAS PRODUCTS COMPANY, OF ST. LOUIS, MISSOURI, A CORPORATION OF MISSOURI

GRASS CATCHER FOR LAWN MOWERS

Application filed July 7, 1930. Serial No. 465,895.

This invention relates generally to grass catchers for lawn movers, and more particularly to grass catchers of this type which are provided with rigid bottom walls and substantially U-shaped, upstanding side walls formed of canvas or like material, the predominant object of the invention being to provide the bottom walls of grass catchers of this type with lips at their forward edges adapted to prevent accidental displacement from the grass catcher of grass which has been deposited therein.

Prior to this invention, grass catchers of the type to which this invention relates have been produced with no means present at the forward edges of the bottom walls of the grass catchers to prevent accidental displacement of grass deposited in the grass catchers during the use of the lawn mowers with which the grass catchers were associated. The result of this situation was that when the lawn mowers and the associated grass catchers were subjected to rapid forward and rearward movement during use of the lawn mowers, some of the grass within the grass catchers woud be accidentally discharged from the grass catchers by being propelled over the forward edges of the bottom walls of the grass catchers.

The continued accidental discharge of grass from grass catchers in the manner described was quite annoying, and the prime object of the present invention is to eliminate this annoyance. This object is accomplished by providing a grass catcher which is provided at the forward edge of its bottom wall with an upstanding lip, which at its upper portion is inclined upwardly and rearwardly. The lip referred to serves as a stop to prevent the grass from being accidentally discharged over the forward edge of the grass catcher, and because of the inclined arrangement of the upper portion thereof the lip does not interfere with free movement of grass into the grass catcher as said grass is thrown rearwardly on being cut by the lawn mower.

Figure 1:
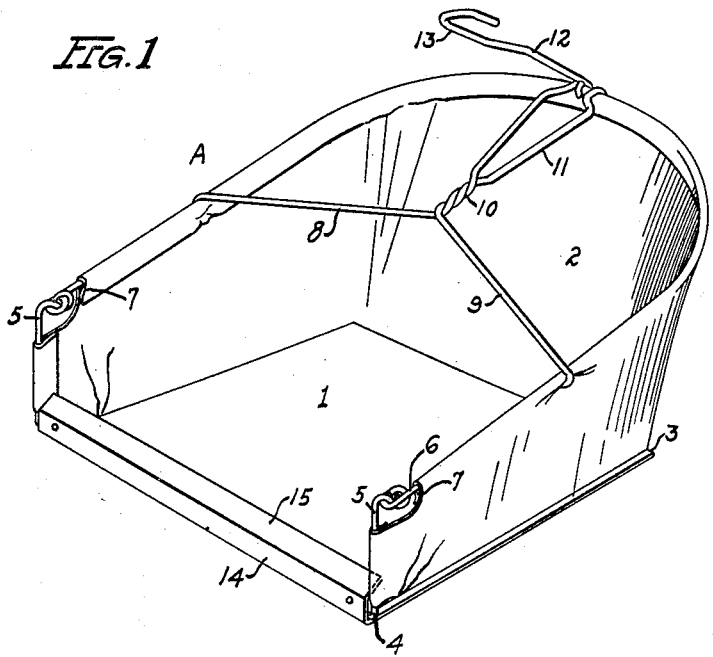
Fig. 1 is a perspective of my improved grass catcher.
Figure 2:
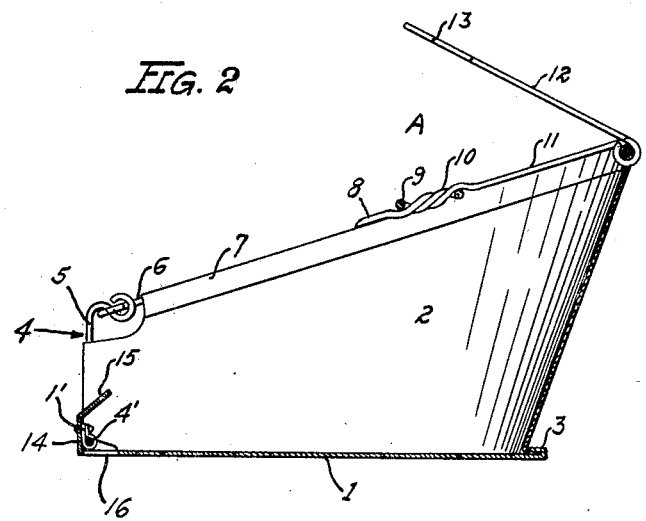
Fig. 2 is a longitudinal section through the grass catcher illustrated in Fig. 1.

In the drawings, wherein is shown for the purpose of illustration, merely, one embodiment of the invention, A designates my improved grass catcher, said grass catcher preferably comprising a bottom wall 1 formed of sheet metal or other suitable material. The grass catcher includes, also, an upstanding, substantially U-shaped fabric wall 2, which provides the rear and side walls thereof, said fabric wall 2 being connected at its lower edge to the bottom wall 1 in any suitable manner, as by having its lower edge clamped by the doubled over marginal edge portion 3 of the bottom wall. 4 designates a wire frame which is provided with a horizontal portion 4' secured by suitable clips 1' to the bottom wall of the grass catcher at the front edge thereof, and said wire frame 4 includes upwardly extended arms 5 at its opposite ends to which the forward ends of the fabric wall 2 are attached.

6 designates a top, U-shaped wire frame which is connected at its forward ends to the upper ends of the portions 5 of the frame 4, this top frame 6 being passed through a continuous loop 7 formed at the upper edge of the fabric wall 2, whereby said fabric wall is maintained in its proper shape. The grass catcher illustrated in the drawings is provided with suitable means for handling same, said means comprising a pair of wire elements 8 and 9 which are twisted together at 10 and extend outwardly from said twisted portion to oppositely disposed edge portions of the side walls of the grass catcher where the outer end portions of said wire elements are bent to embrace the top wire frame 6. Rearwardly of the twisted portion 10 of the handling means the wire elements are bent outwardly slightly and are extended rearwardly to provide a handle portion 11, an the end portions of the wire elements 8 and 9 at the rear of the handle portion 11 are bent to embrace the wire frame within the top edge of the rear wall portion of the fabric wall 2. The grass catcher is also provided with a suspension member 12 which at its lower portion embraces the wire frame 6 at the rear of the grass catcher and is provided with a hook 13 at its upper end adapted to embrace the handle of a lawn mower with which the grass catcher is associated.

At the forward edge of the bottom wall 1 of the grass catcher the material of said bottom wall is bent upwardly, as indicated at 14, and at the upper edge of this upwardly bent portion 14 said material is provided with an upwardly an rearwardly inclined portion 15. Thus the bottom wall 1 of the grass catcher is provided with an upstanding lip which extends transversely of the grass catcher from side to side thereof, which very effectively prevents accidental discharge of grass from the grass catcher, and because of the inclined arrangement of the upper portion of the lip, said lip will not, in any manner, interfere with free movement of grass into the grass catcher when it is thrown rearwardly when cut by the lawn mower associated with the grass catcher.

For the purpose of attaching my improved grass catcher to an associated lawn mower, I provide the bottom wall thereof with apertures 16 adapted to receive ends of arms (not shown) which are fixed to the lawn mower and are ordinarily employed for this purpose.

I claim:

1. A grass catcher including a bottom wall, and a rigid upstanding lip at the forward edge of said bottom wall adapted to prevent accidental discharge of grass from the grass catcher, said lip being extended transversely of said bottom wall from side to side thereof, and including a substantially vertical lower portion and an upwardly and rearwardly inclined upper portion, the inclination of said inclined upper portion of the lip being such as to prevent accumulation of grass thereon.

2. A grass catcher including a bottom wall, and an upstanding lip at the forward edge of said bottom wall adapted to prevent accidental discharge of grass from the grass catcher, said lip being extended transversely of said bottom wall from side to side thereof, and including a substantially vertical lower portion and an upwardly and rearwardly inclined upper portion, said bottom wall and said lower and upper portions of said lip being parts of a unitary, integral structure and the inclination of said inclined upper portion of the lip being such as to prevent accumulation of grass thereon.

In testimony that I claim the foregoing I hereunto affix my signature.

WILLIAM H. DEES.